(12) United States Patent
Dlala et al.

(10) Patent No.: US 12,456,890 B2
(45) Date of Patent: Oct. 28, 2025

(54) SKEWED ROTOR FOR ELECTRIC MOTOR

(71) Applicant: Atieva, Inc., Newark, CA (US)

(72) Inventors: Emad Dlala, Pleasanton, CA (US); Yateendra Deshpande, Sunnyvale, CA (US); Vivek Meenakshi Sundaram, Newark, CA (US)

(73) Assignee: Atieva, Inc., Newark, CA (US)

( * ) Notice: Subject to any disclaimer, the term of this patent is extended or adjusted under 35 U.S.C. 154(b) by 251 days.

(21) Appl. No.: 18/349,469

(22) Filed: Jul. 10, 2023

(65) Prior Publication Data

US 2024/0022128 A1 Jan. 18, 2024

Related U.S. Application Data

(60) Provisional application No. 63/368,191, filed on Jul. 12, 2022.

(51) Int. Cl.
*H02K 1/27* (2022.01)
*H02K 1/276* (2022.01)

(52) U.S. Cl.
CPC ......... *H02K 1/276* (2013.01); *H02K 2201/06* (2013.01)

(58) Field of Classification Search
CPC .... H02K 1/276; H02K 2201/06; H02K 29/03; H02K 1/2766
See application file for complete search history.

(56) References Cited

U.S. PATENT DOCUMENTS

| | | |
|---|---|---|
| 3,453,466 A | 7/1969 | Olson |
| 5,041,749 A | 8/1991 | Gaser et al. |
| 6,002,190 A | 12/1999 | Kieffer |
| 6,218,753 B1 | 4/2001 | Asano et al. |
| 10,523,072 B2 | 12/2019 | Tang et al. |
| 10,770,939 B1 | 9/2020 | Uchimura et al. |
| 2005/0023922 A1* | 2/2005 | Araki .................. H02K 1/2766 310/168 |

(Continued)

FOREIGN PATENT DOCUMENTS

| | | |
|---|---|---|
| CN | 204578323 U | 8/2015 |
| CN | 112968560 A | 6/2021 |

(Continued)

OTHER PUBLICATIONS

International Search Report and Written Opinion for PCT Application No. PCT/US2023/069865, mailed on Oct. 16, 2023, 13 pages.

(Continued)

*Primary Examiner* — Thomas Truong

(74) *Attorney, Agent, or Firm* — Brake Hughes Bellermann LLP

(57) ABSTRACT

An electric motor comprises: a stator having slots; and a rotor including a stack of rotor laminations, the rotor comprising: a first substack of the rotor laminations, wherein the rotor laminations in the first substack include first rivet holes and first magnet holes with first permanent magnets; and a second substack of the rotor laminations, wherein the rotor laminations in the second substack include second rivet holes and second magnet holes with second permanent magnets, and wherein an orientation of the first sub stack and the second substack relative to each other provides the rotor with a skew.

12 Claims, 4 Drawing Sheets

(56) References Cited

U.S. PATENT DOCUMENTS

| | | | |
|---|---|---|---|
| 2011/0198959 A1* | 8/2011 | Vyas | H02K 1/2766 |
| | | | 310/156.53 |
| 2017/0366056 A1* | 12/2017 | Tang | H02K 1/2766 |
| 2019/0140501 A1* | 5/2019 | Leonardi | H02K 1/2766 |
| 2020/0244117 A1 | 7/2020 | Goldstein | |
| 2022/0085672 A1 | 3/2022 | Beetz et al. | |

FOREIGN PATENT DOCUMENTS

| | | | |
|---|---|---|---|
| KR | 20100057935 A * | 6/2010 | |
| WO | 2022139500 A1 | 6/2022 | |

OTHER PUBLICATIONS

Nobahari et al: "Various skewing arrangements and relative position of dual rotor of an axial flux induction motor, modelling and performance evaluation," IET Electric Power Applications, vol. 12, Iss. 4, 2018, pp. 575-580.

* cited by examiner

SKEWED ROTOR FOR ELECTRIC MOTOR

CROSS-REFERENCE TO RELATED APPLICATION

This application claims benefit, under 35 U.S.C. § 119, of U.S. Provisional Patent Application No. 63/368,191, filed on Jul. 12, 2022, entitled "SKEWED ROTOR FOR ELECTRIC MOTOR", the disclosure of which is incorporated by reference herein in its entirety.

TECHNICAL FIELD

This document relates to a skewed rotor for an electric motor.

BACKGROUND

In recent years, the world's transportation has begun a transition away from powertrains primarily driven by fossil fuels and toward more sustainable energy sources. The majority of such increasingly prevalent powertrains include electric motors powered by on-board energy storages. The quality of the customer's experience of a vehicle is at least in part driven by the performance of the electric motor, including factors such as noise, vibration and harshness (NVH). Improving the powertrain performance with regard to NVH provides an advantage for a vehicle manufacturer.

SUMMARY

In an aspect, an electric motor comprises: a stator having slots; and a rotor including a stack of rotor laminations, the rotor comprising: a first substack of the rotor laminations, wherein the rotor laminations in the first substack include first rivet holes and first magnet holes with first permanent magnets; and a second substack of the rotor laminations, wherein the rotor laminations in the second substack include second rivet holes and second magnet holes with second permanent magnets, and wherein an orientation of the first substack and the second substack relative to each other provides the rotor with a skew.

Implementations can include any or all of the following features. The skew is based on an angle between adjacent slots of the stator. The skew is equal to about one half of the angle between the adjacent slots of the stator. All of the rotor laminations in the first and second substacks have a common stamping pattern, and wherein the second substack is oriented opposite to the first substack to provide the skew. The common stamping pattern comprises an asymmetry of at least a subset of the first and second magnet holes with regard to a rotor radius. The first and second rivet holes do not have the asymmetry. The asymmetry comprises that the subset of the first and second magnet holes are offset in a rotor rotational direction from the rotor radius. The rotor laminations in the first substack have a first stamping pattern, wherein the rotor laminations in the second substack have a second stamping pattern different from the first stamping pattern. The first stamping pattern is asymmetric with regard to a rotor radius, and wherein the second stamping pattern is symmetric with regard to the rotor radius. The first and second rivet holes are symmetric with regard to the rotor radius. The electric motor further comprises a first key in each of the rotor laminations of the first sub stack, and a second key in each of the rotor laminations of the second substack. The first and second keys are symmetric with regard to a rotor radius. Each of the first and second magnet holes have substantially a trapezoid shape, the trapezoid shape having a pair of parallel sides and a pair of nonparallel sides. Each of the parallel sides of the trapezoid shape is offset from a rotor rotational direction. At least one of the nonparallel sides of the trapezoid shape is substantially parallel with a rotor radius.

BRIEF DESCRIPTION OF DRAWINGS

Like reference symbols in the various drawings indicate like elements.

DETAILED DESCRIPTION

This document describes examples of systems and techniques for providing a skew in the rotor of an electric motor. In some implementations, a common stamping pattern can be used for all rotor laminations in the electric motor, and respective substacks of the rotor laminations can be oriented relative to each other to provide the rotor with a skew to cancel out a slotting harmonic and/or other harmonics of interest. In other implementations, the substacks of rotor laminations can have different stamping patterns from each other, and the substacks are oriented relative to each other to provide the rotor with a skew.

When an electric motor creates a rotating magnetic field using a stator, that stator will have a finite number of slots. Any of various numbers of slots can be used, including, but not limited to, 72 or 48 slots. Due to the finite slot number, the magnetic field generated by the electric motor will have a ripple of, for example, a $(72\pm p)$ or $(48\pm p)$ order, corresponding to the number of stator slots, where p is the number of pole pairs. Such ripple in the magnetic field can create forces and torque pulsations/ripples at the same order as the number of slots. This can affect the NVH of the vehicle. The present subject matter presents approaches for addressing this and other situations to provide an improved electric motor.

Examples described herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons.

Examples described herein refer to a top, bottom, front, or rear. These and similar expressions identify things or aspects in a relative way based on an express or arbitrary notion of perspective. That is, these terms are illustrative only, used for purposes of explanation, and do not necessarily indicate the only possible position, direction, and so on.

Figure 1:
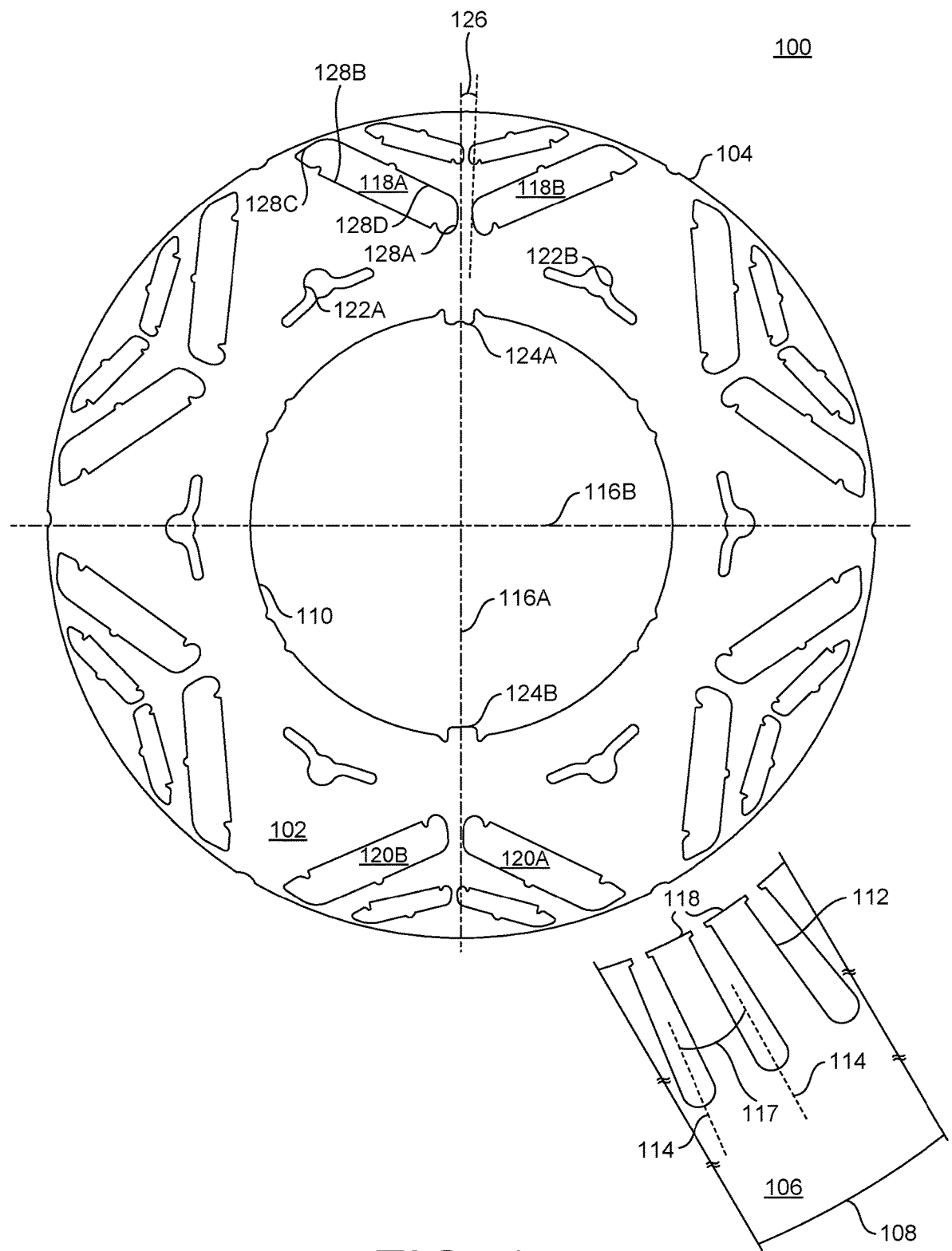
FIG. 1 shows an example of an electric motor.

FIG. 1 shows an example of an electric motor 100. The electric motor 100 can be used with one or more other examples described elsewhere herein. The electric motor 100 is schematically illustrated and some components are not shown for simplicity. Particularly, a rotor lamination 102 is shown that is part of a rotor 104 in the electric motor 100. Moreover, a portion of a stator lamination 106 is shown that is in turn part of a stator 108 in the electric motor 100.

The rotor 104 can include multiple rotor laminations, including, but not limited to, the rotor lamination 102, that together form a rotor body. The rotor 104 may also have a rotor shaft (not shown) positioned within an opening 110, as well as one or more end plates (not shown) at either or both ends of the rotor body.

The stator 108 can include multiple stator laminations that together form a stator body, including, but not limited to, the stator lamination 106. The stator 108 may also have stator windings (not shown) positioned within each of slots 112 formed by the stator laminations and arranged in a pattern to form poles. The slots 112 can have any of multiple shapes including, but not limited to, substantially as shown. Each of the slots 112 can be positioned along a corresponding one of radii 114 from the center of the stator 108. Adjacent ones of the slots 112 can form an angle 117 with each other. Likewise, adjacent ones of stator teeth 118 can form the angle 117 with each other.

The geometry of the rotor lamination 102 can be defined by a stamping pattern. In some implementations, manufacture of the rotor lamination 102 can begin with metal sheet stock that is then stamped or otherwise machined (e.g., cut) into its final shape in one or more operations. The spatial configuration of the rotor lamination 102 is here described in terms of a stamping pattern regardless of the particular operation(s) that may be performed in manufacturing the rotor lamination 102. In the following, the stamping pattern will be exemplified with reference to a rotor radius or a rotor diameter. Here, rotor diameters 116A-116B are shown for illustration, the rotor diameters 116A-116B being perpendicular to each other.

The rotor lamination 102 can include holes for one or more purposes. Here, the rotor lamination 102 includes multiple magnet holes that can accommodate permanent magnets (not shown, for clarity) for the rotor 104. Some of these magnet holes will be discussed as examples illustrating the stamping pattern. The rotor lamination 102 includes magnet holes 118A-118B whose positions can be characterized with reference to the rotor diameter 116A. Similarly, the rotor lamination 102 includes magnet holes 120A-120B whose positions can likewise be characterized with reference to the rotor diameter 116A.

The rotor lamination 102 here also includes rivet holes 122A-122B among other rivet holes. Each of the rivet holes 122A-122B can accommodate a rivet axially extending through the rotor body to compress the rotor 104. The rotor lamination 102 here also includes keys 124A-124B positioned at the edge of the opening 110. Each of the keys 124A-124B can serve to ensure proper orientation between the rotor 104 and other structure (e.g., a rotor shaft extending through the opening 110).

At least some of the magnet holes of the rotor lamination 102 can be offset with regard to the rotor diameter 116A and/or 116B. Here, the magnet holes 118A and 120A are positioned so that their respective edges abut the rotor diameter 116A. The magnet holes 118B and 120B, by contrast, are rotated so that their respective edges are positioned at an angle 126 away from the rotor diameter 116A. The angle 126 is defined with reference to the center of the rotor 104. That is, the stamping pattern can have an asymmetry in at least a subset of the magnet holes 118A-118B and 120A-120B with regard to the rotor diameter 116A (or a rotor radius of the rotor diameter 116A). This asymmetry can comprise that the magnet holes of the subset are offset from the rotor radius in a rotational direction of the rotor 104. For example, due to the angle 126 the magnet holes 118B and 120B can be characterized as being positioned with an offset in a rotor rotational direction from the rotor radius. Other offsets can be used additionally or alternatively.

That is, the offset between the magnet holes 118A-118B here extends on the right side of the rotor diameter 116A, whereas the offset between the magnet holes 120A-120B here extends on the left side of the rotor diameter 116A. The perspective from which the current plan view of the rotor lamination 102 is shown can then arbitrarily be referred to as a front side. In an opposite view, the other face of the rotor lamination 102 would be visible, and these offsets could then instead be characterized as extending on the left and right sides, respectively, of the rotor diameter 116A. That opposite view can then arbitrarily be referred to as a rear side.

The magnet holes of the rotor lamination 102 can have one or more shapes. In some implementations, at least one of the magnet holes has substantially a trapezoid shape. Here, the magnet holes in the rotor lamination 102 all have substantially trapezoid shapes of various sizes. The magnet hole 118A can have a trapezoid shape with sides 128A-128D. The sides 128A and 128C can be referred to as a pair of nonparallel sides because they are not parallel to each other. The sides 128B and 128D can be referred to as a pair of parallel sides because they are substantially parallel to each other. Here, the sides 128B and 128D are not tangential to the rotor rotational direction of the rotor 104. The sides 128B and 128D are therefore offset from the rotor rotational direction. The side 128A, which is part of the pair of nonparallel sides, is here substantially parallel with the rotor radius of the rotor diameter 116A.

In the stamping pattern of the rotor lamination 102, the rivet holes may not be offset or asymmetrical. Here, the rivet holes 122A-122B are symmetrical with regard to the rotor diameter 116A. As such, the rivet holes 122A-122B do not have the asymmetry that other aspects of the stamping pattern may have (e.g., the magnet holes 118A-118B and 120A-120B).

In the stamping pattern of the rotor lamination 102, the keys may not be offset or asymmetrical. Here, the keys 124A-124B are symmetrical with regard to the rotor diameter 116A. As such, the keys 124A-124B are symmetric unlike one or more other aspects of the stamping pattern (e.g., the magnet holes 118A-118B and 120A-120B).

Figure 2:
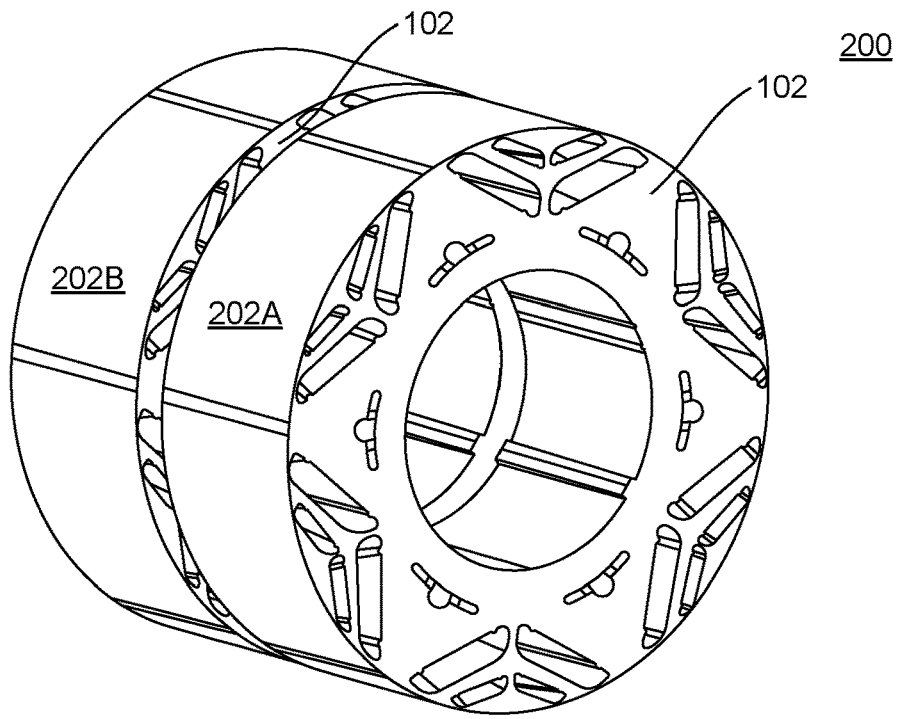
FIG. 2 shows an example of a rotor having substacks arranged with a skew.

FIG. 2 shows an example of a rotor 200 having substacks 202A and 202B arranged with a skew. The substacks 202A and/or 202B can be used with one or more other examples described elsewhere herein. The substacks 202A-202B are here shown spaced apart from each other for illustrative purposes. Each of the substacks 202A and 202B includes multiple rotor laminations arranged in a respective stack. Particularly, the rotor laminations of the substacks 202A-202B here have a common stamping pattern. For example, the rotor laminations of the substacks 202A-202B may here all have the stamping pattern of the rotor lamination 102 in FIG. 1. Moreover, the rotor laminations 102 in the substack 202A are here oriented in an opposite direction to those of the substack 202B. In the substack 202A, the rotor laminations 102 are here oriented so that the front side of the rotor laminations 102 (e.g., the side visible in FIG. 1) is facing outward in the illustration. In the substack 202B, on the other hand, the rotor laminations 102 are here oriented so that the rear side of the rotor laminations 102 (e.g., the side not visible in FIG. 1) is visible in the illustration. This orientation of the substacks 202A-202B relative to each other provides the rotor 200 with a skew. The skew can be based on the angle between adjacent slots of the stator to be used with the rotor 200 (or equivalently, the angle between adjacent teeth of the stator). In some implementations, the skew is based on the angle 117 in FIG. 1. For example, to eliminate a slotting harmonic when the stator has 72 slots, the skew angle can be about one half of 360 degrees divided by 72 slots, which is 2.5 degrees. This can be accomplished by making the angle 126 (FIG. 1) in the rotor laminations 102 about one fourth (e.g., about 25%) of the angle between adjacent slots of the stator.

Figure 3:
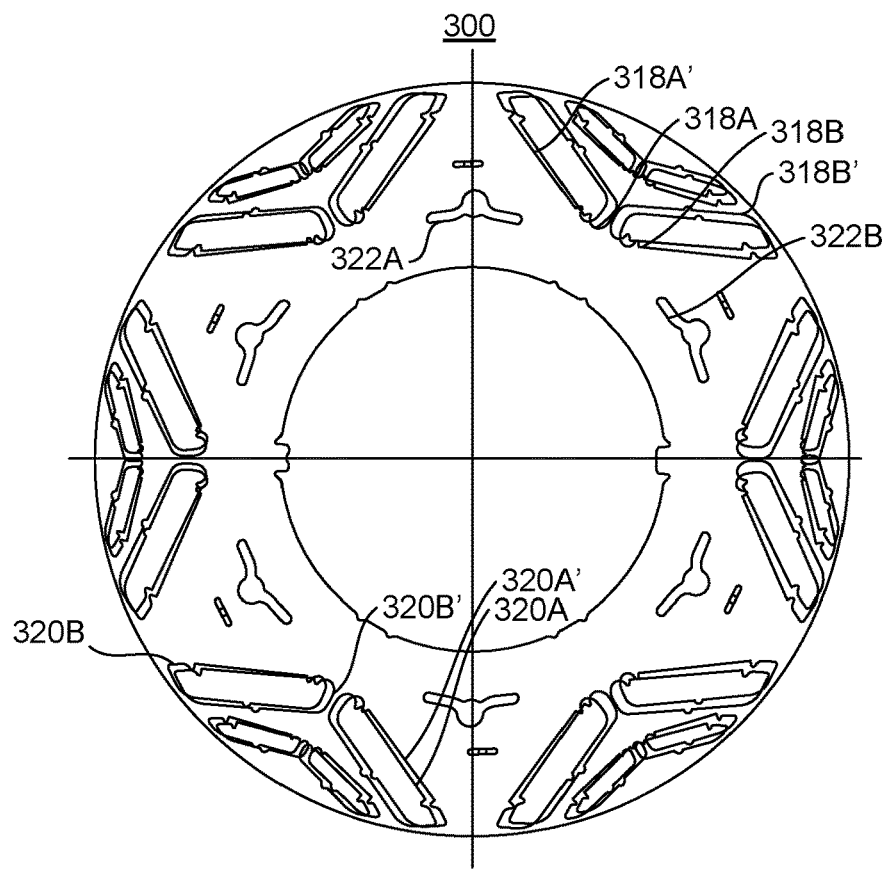
FIG. 3 schematically shows the stamping patterns of the substacks in FIG. 2.

FIG. 3 schematically shows the stamping patterns of the substacks 202A-202B of FIG. 2. The stamping patterns are here superimposed on each other, in a superposition 300, to illustrate the position of magnet holes when viewed along a rotation axis of the rotor. With regard to the rivet holes the stamping patterns may be symmetrical when viewed from the front and rear side. As such, rivet holes 322A and 322B are here common to the stamping patterns in the superposition 300.

Magnet holes, on the other hand, may not be symmetrical in the stamping patterns. As such, magnet holes from the respective substacks 202A-202B may therefore be individually visible in the superposition 300. Here, magnet holes 318A and 318B belong to the substack 202A and correspond, respectively, to the magnet holes 118A and 118B in FIG. 1 when the front side of the rotor lamination 102 is viewed. Magnet holes 318A' and 318B', moreover, belong to the substack 202B and correspond, respectively, to the magnet holes 118A and 118B in FIG. 1 when the rear side of the rotor lamination 102 is viewed. Similarly, magnet holes 320A and 320B belong to the substack 202A and correspond, respectively, to the magnet holes 120A and 120B in FIG. 1 when the front side of the rotor lamination 102 is viewed; and magnet holes 320A' and 320B' belong to the substack 202B and correspond, respectively, to the magnet holes 120A and 120B in FIG. 1 when the rear side of the rotor lamination 102 is viewed. As such, the orientation of the substacks 202A-202B relative to each other provides the rotor with a skew.

Figure 4:
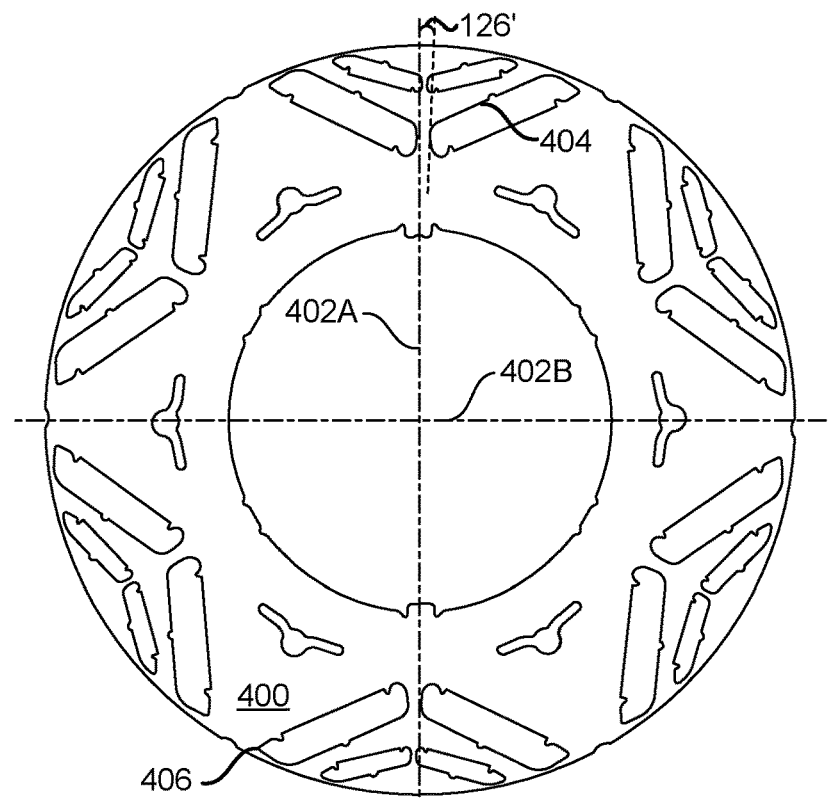
FIGS. 4-5 show examples of rotor laminations having different stamping patterns from each other.
Figure 5:
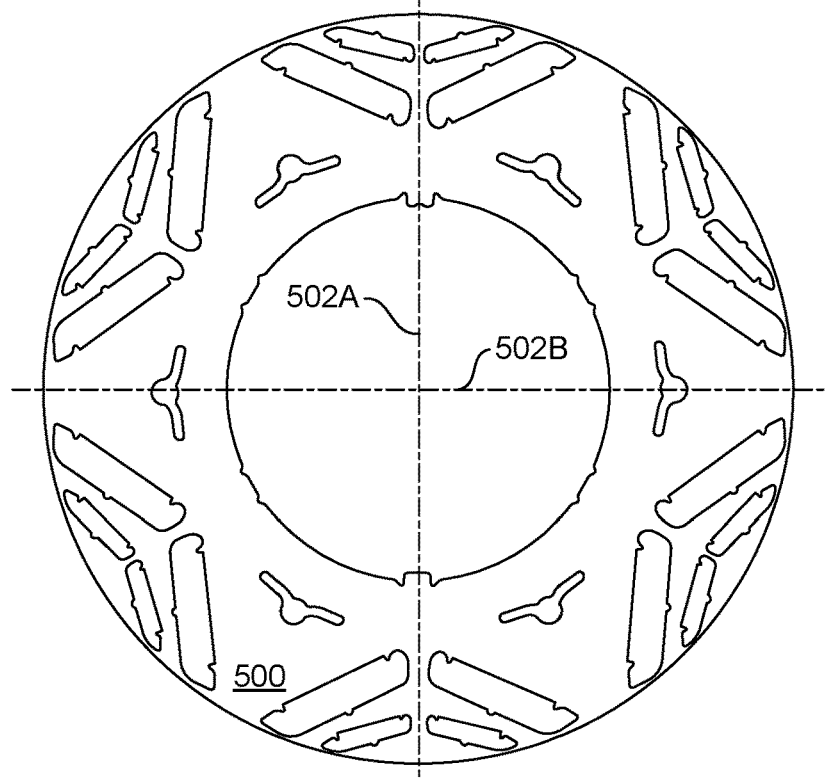

FIGS. 4-5 show examples of rotor laminations 400 and 500 having different stamping patterns from each other. The rotor lamination 400 may have a stamping pattern that is asymmetric, in analogy with that of the rotor lamination 102 in FIG. 1. The rotor lamination 400 has magnet holes with an asymmetry relative to rotor diameters 402A and/or 402B. For example, magnet holes 404 and 406 in the rotor lamination 400 are rotated so that their respective edges are positioned at an angle 126' away from the rotor diameter 402A. However, the asymmetry in the rotor lamination 400 may be about twice as large as that of the rotor lamination 102. For example, the angle 126' can be about double the angle 126 in FIG. 1. The rotor lamination 400 has rivet holes and/or keys that are symmetric relative to the rotor diameters 402A and/or 402B.

The rotor lamination 500, by contrast, may have a stamping pattern that is different from that of the rotor lamination 400. For example, the rotor lamination 500 has magnet holes that are symmetric relative to rotor diameters 502A and/or 502B. As another example, the rotor lamination 500 has rivet holes and/or keys that are also symmetric relative to the rotor diameters 502A and/or 502B.

Figure 6:
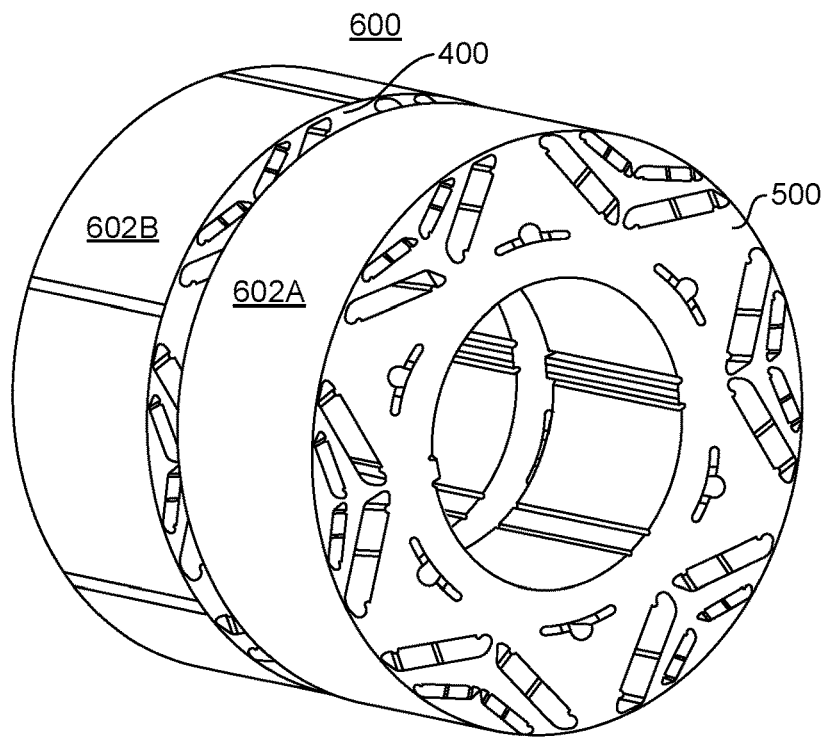
FIG. 6 shows an example of a rotor having substacks with the rotor laminations of FIGS. 4-5 arranged with a skew.

FIG. 6 shows an example of a rotor 600 having substacks 602A and 602B with the rotor laminations 400 and 500 of FIGS. 4-5, respectively, arranged with a skew. The substacks 602A and/or 602B can be used with one or more other examples described elsewhere herein. The substacks 602A-602B are here shown spaced apart from each other for illustrative purposes. Each of the substacks 602A and 602B includes multiple rotor laminations arranged in a respective stack. For example, the rotor laminations of the substack 602A may here all have the stamping pattern of the rotor lamination 500. Because the rotor laminations 500 are symmetrical with regard to magnet holes, rivet holes, and keys, the rotor laminations 500 show the same stamping pattern whether viewed from the front side or the rear side. As another example, the rotor laminations of the substack 602B may here all have the stamping pattern of the rotor lamination 400. The rotor laminations 400 are asymmetrical with regard to magnet holes, and symmetrical with regard to rivet holes and keys. The rotor laminations 400 can therefore be oriented with the front side or the rear side visible in the present view. The substacks 602A-602B can be oriented relative to each other to provide the rotor 600 with a skew. The skew can be based on an angle of the slots of the stator to be used with the rotor 600. For example, to eliminate a slotting harmonic when the stator has 72 slots, the skew angle can be about one half of 360 degrees divided by 72 slots, which is 2.5 degrees. This can be accomplished by making the angle 126' (FIG. 4) in the rotor laminations 400 about one half (e.g., about 50%) of the angle of the slots of the stator.

Figure 7:
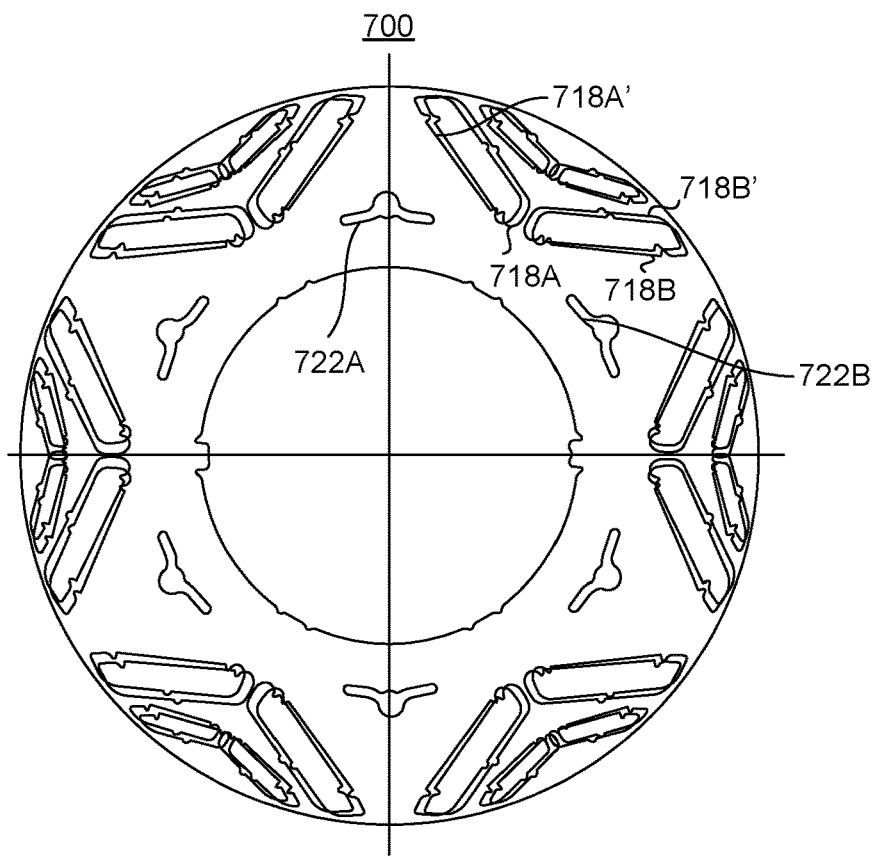
FIG. 7 schematically shows the stamping patterns of the substacks of FIG. 6.

FIG. 7 schematically shows the stamping patterns of the substacks 602A-602B of FIG. 6. The stamping patterns are here superimposed on each other, in a superposition 700, to illustrate the position of magnet holes when viewed along a rotation axis of the rotor. With regard to the rivet holes the stamping patterns may be symmetrical when viewed from the front and rear side. As such, rivet holes 722A and 722B are here common to the stamping patterns in the superposition 700.

Magnet holes, on the other hand, may not be symmetrical in the stamping patterns. As such, magnet holes from the respective substacks 602A-602B may therefore be individually visible in the superposition 700. Here, magnet holes 718A and 718B belong to the substack 602A and correspond to the stamping pattern of the rotor lamination 500. Magnet holes 718A' and 718B', moreover, belong to the substack 602B and correspond to the stamping pattern of the rotor lamination 400. As such, the orientation of the substacks 602A-602B relative to each other provides the rotor with a skew.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. An electric motor comprising:
   a stator having slots; and
   a rotor including a stack of rotor laminations, the rotor comprising:
      a first substack of the rotor laminations, wherein the rotor laminations in the first substack include first rivet holes and first magnet holes with first permanent magnets; and
      a second substack of the rotor laminations, wherein the rotor laminations in the second substack include second rivet holes and second magnet holes with second permanent magnets, and wherein an orientation of the first substack and the second substack relative to each other provides the rotor with a skew;
      wherein the rotor laminations in the first substack have a first pattern, wherein the rotor laminations in the second substack have a second pattern different from the first pattern; and
      wherein the first pattern is asymmetric with regard to a rotor radius, and wherein the second pattern is symmetric with regard to the rotor radius.

2. The electric motor of claim 1, wherein the skew is based on an angle between adjacent slots of the stator.

3. The electric motor of claim 2, wherein the skew is equal to about one half of the angle between the adjacent slots of the stator.

4. The electric motor of claim 1, wherein the first rivet holes do not have the asymmetry of the first pattern.

5. The electric motor of claim 1, wherein the asymmetry of the first pattern comprises that the first magnet holes are offset in a rotor rotational direction from the rotor radius.

6. The electric motor of claim 1, wherein the first and second rivet holes are symmetric with regard to the rotor radius.

7. The electric motor of claim 1, further comprising a first key in each of the rotor laminations of the first substack, and a second key in each of the rotor laminations of the second substack.

8. The electric motor of claim 7, wherein the first and second keys are symmetric with regard to a rotor radius.

9. The electric motor of claim 7, wherein:
   the first substack of the rotor laminations includes a first center opening, and wherein the first keys are positioned at an edge of the first center opening; and
   the second substack of the rotor laminations includes a second center opening, and wherein the second keys are positioned at an edge of the second center opening.

10. The electric motor of claim 1, wherein each of the first and second magnet holes have substantially a trapezoid shape, the trapezoid shape having a pair of parallel sides and a pair of nonparallel sides.

11. The electric motor of claim 10, wherein each of the parallel sides of the trapezoid shape is offset from a rotor rotational direction.

12. The electric motor of claim 10, wherein at least one of the nonparallel sides of the trapezoid shape is substantially parallel with a rotor radius.

* * * * *